United States Patent
Benjestorf (10) Patent No.: US 9,197,292 B2
(45) Date of Patent: Nov. 24, 2015

(54) NON-MATING CONNECTOR (71) Applicant: Josjua S. Benjestorf, Stockton, CA (US)

(72) Inventor: Josjua S. Benjestorf, Stockton, CA (US)

(73) Assignee: NMC Corporation, Stockton, CA (US)

( * ) Notice: Subject to any disclaimer, the term of this patent is extended or adjusted under 35 U.S.C. 154(b) by 32 days.

(21) Appl. No.: 14/064,116

(22) Filed: Oct. 26, 2013

(65) Prior Publication Data
US 2014/0120747 A1    May 1, 2014

Related U.S. Application Data

(60) Provisional application No. 61/719,434, filed on Oct. 28, 2012.

(51) Int. Cl.
H04B 5/00    (2006.01)

(52) U.S. Cl.
CPC ............ H04B 5/0012 (2013.01); H04B 5/0093 (2013.01)

(58) Field of Classification Search
CPC ..... H01F 38/14; H01F 38/12; H01R 13/6205; H04B 5/0012; H04B 5/0093
USPC .......................................... 439/950; 336/107
See application file for complete search history.

(56) References Cited

U.S. PATENT DOCUMENTS

| | | | | |
|---|---|---|---|---|
| 3,995,209 A | * | 11/1976 | Weston | ........................ 323/355 |
| 4,144,485 A | * | 3/1979 | Akita | ........................... 307/134 |
| 4,416,495 A | | 11/1983 | Regan | |
| 4,549,105 A | * | 10/1985 | Yamamoto et al. | ............. 310/87 |
| 5,684,380 A | * | 11/1997 | Woody et al. | ................. 320/108 |
| 5,909,099 A | * | 6/1999 | Watanabe et al. | ............. 320/108 |
| 7,210,940 B2 | * | 5/2007 | Baily et al. | ...................... 439/38 |
| 7,277,025 B2 | * | 10/2007 | Allan | ......................... 340/854.8 |
| 7,598,704 B2 | | 10/2009 | Taniguchi | |
| 8,102,276 B2 | | 1/2012 | Sugiura | |
| 8,222,827 B2 | | 7/2012 | Kuennen | |
| 8,350,526 B2 | * | 1/2013 | Dyer et al. | ..................... 320/109 |
| 8,400,017 B2 | | 3/2013 | Kurs | |
| 8,633,616 B2 | * | 1/2014 | Soar | ............................. 307/104 |
| 2004/0067683 A1 | | 4/2004 | Gehrke | |
| 2011/0143556 A1 | * | 6/2011 | Hsu | ................................ 439/39 |
| 2012/0228529 A1 | * | 9/2012 | Trewin et al. | ................. 250/551 |
| 2013/0052873 A1 | | 2/2013 | Riezebos | |
| 2014/0102807 A1 | * | 4/2014 | Zhao et al. | ..................... 175/320 |

OTHER PUBLICATIONS

16th Annual Independent Inventors Conference, Claim Drafting for Beginners, Aug. 15-16, USPTO, Alexandria VA.*

* cited by examiner

*Primary Examiner* — Michael Zarroli
(74) *Attorney, Agent, or Firm* — Leslie Virany (57) ABSTRACT

Disclosed is the technology to create connectors based solely on capacitive or inductive coupling that are impervious to ambient moisture giving rise to the idea of waterproof connectors and ultimately to waterproof consumer electronics. NMCs use no conductive tracks for ohmic contacts. The present invention is a waterproof version of a connector conforming to the USB 3.0 standard, which is visually and mechanically similar to current popular USB connectors.

17 Claims, 12 Drawing Sheets

NON-MATING CONNECTOR

BACKGROUND

The standard connector up until now has been referred to simply as "connector" or in some literature mated connector. By definition, an electrical connector is an electro-mechanical device for joining electrical circuits as an interface using a mechanical assembly [1]. Every connector, then, must "join" electrical circuits by making electrical contact between two electrical contact points.

Capacitive coupling can also be used to join ac circuits and simultaneously block dc offsets. This capacitive coupling effect is done without conduction current that standard connectors use to connect two circuit joints. It is done by displacement current. This work focuses on a new type of connector based entirely on this concept called the non-mating connector (NMC). Capacitive and magnetic coupling are not new concepts.

But only until now have they been fully integrated into connector applications. There are applications where coupling is used. Some examples could be coupling two circuits or circuit boards together with one conductive track [2] or capacitive coupled connector for PCB grounding [3]. The NMC is no different in theory as they are based on the same principles of operation; it's the application, again, to connectors.

NMCs use no conductive tracks for ohmic contacts. In short, there currently is no connector on the market today that is truly non-mating. This work introduces the concept and development of the NMC.

Figure 1A:
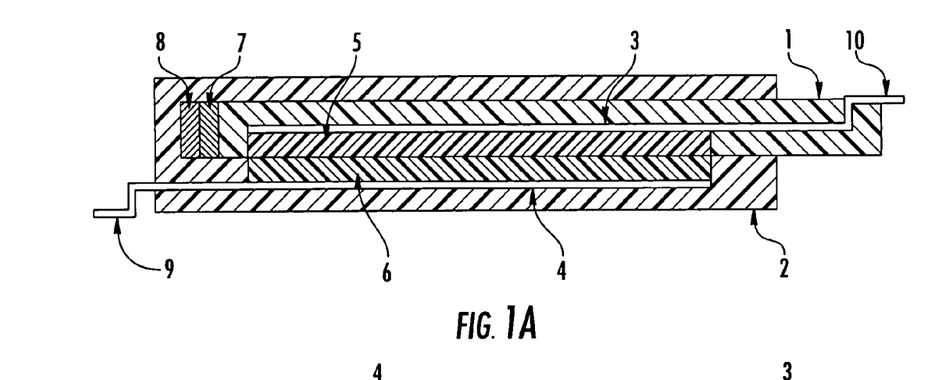
FIG. 1A shows for USB 3.0 A and B receptacles.
Figure 1B:
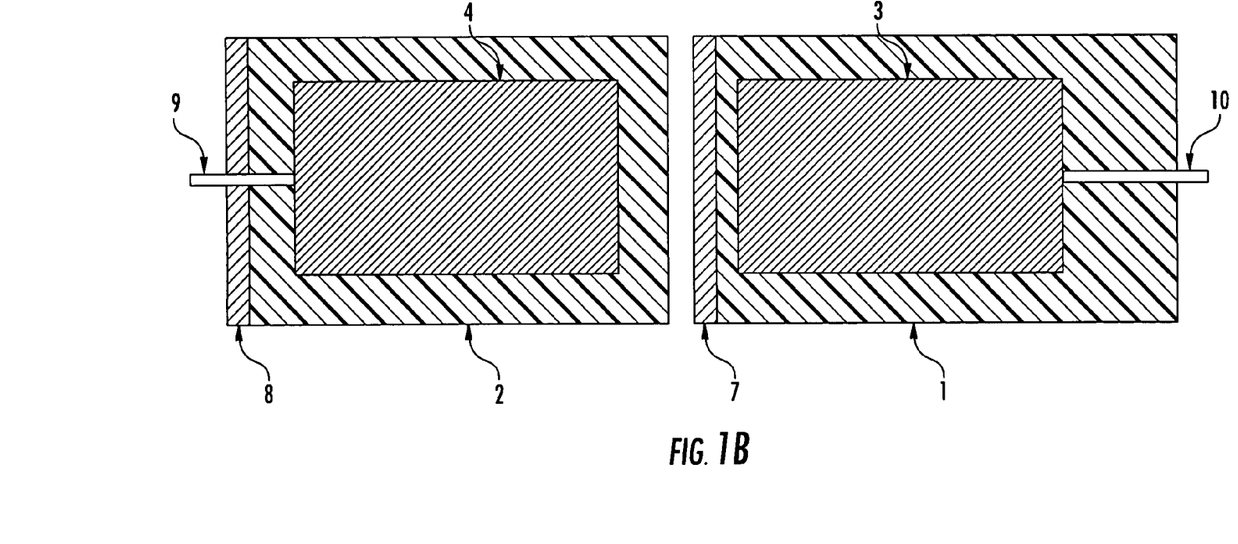
FIG. 1B shows NMC USB 3.0 A and B receptacles
Figure 1C:
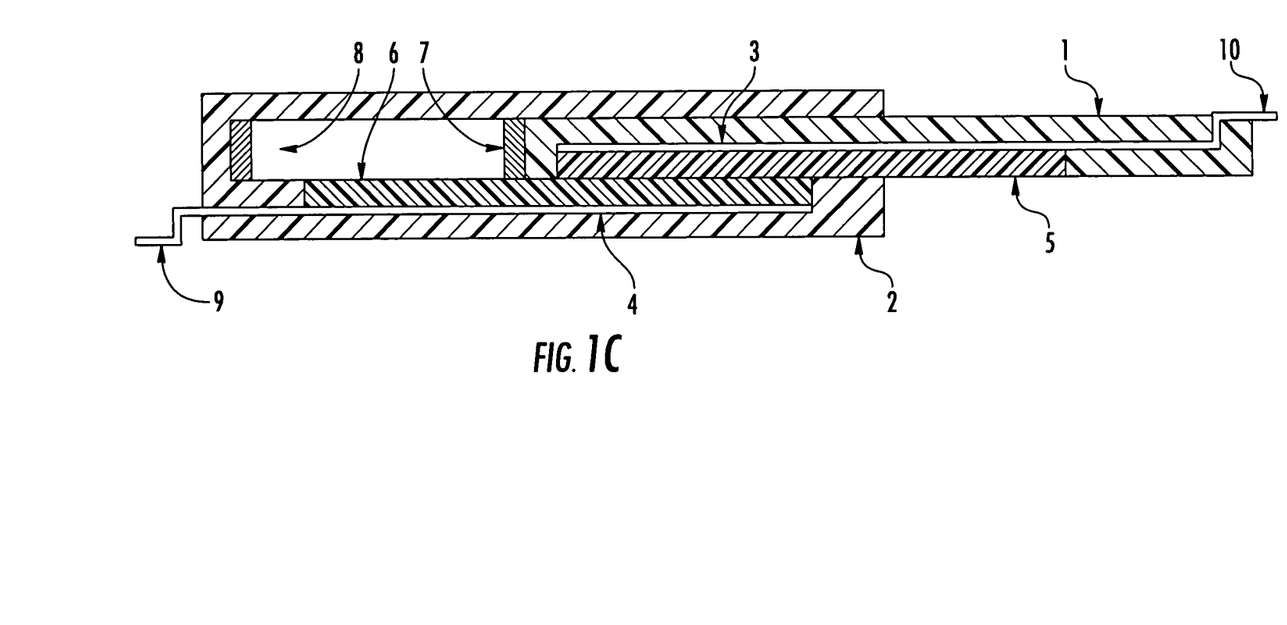
FIG. 1C illustrates the sliding aspect.

The primary vision for NMCs is to create connectors that are impervious to ambient moisture giving rise to the idea of waterproof connectors and ultimately to waterproof consumer electronics. One such application that an NMC can be used for is the USB 3.0 as shown in FIG. 1a (traditional) and 1b (NMC concept).

This work introduces the developments and design of this connector application. The objective for creating the NMC for the USB 3.0 is the same for every NMC application which is to prevent connector contact corrosion, eliminate the use and need for mechanical latches and ultimately create a connector that is 100% sealed from the environment.

Included in this work are both simulated and empirical results obtained for the development of the NMC USB 3.0 which uses two parallel plates for each data line. The technique used to eliminate mechanical latches is one developed by Apple Inc. called MagSafe [4] that has a movable I/O port and housing that uses a magnet to hold the connector in place.

SUMMARY

Principles of Operation

Figure 2A:
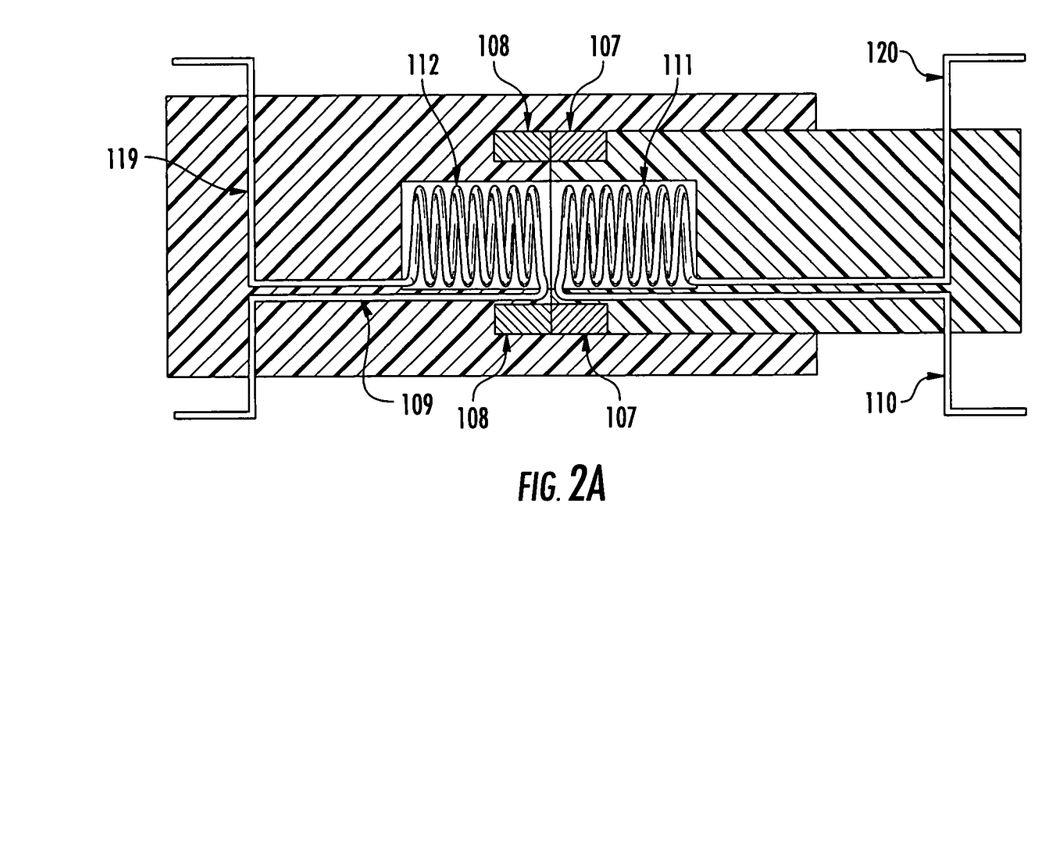
FIG. 2A shows a high-level NMC example showing side-view and FIG. 2B shows the top-view thereof and sliding action and shows high-level example drawings of a single non-mating connector side view
Figure 2B:
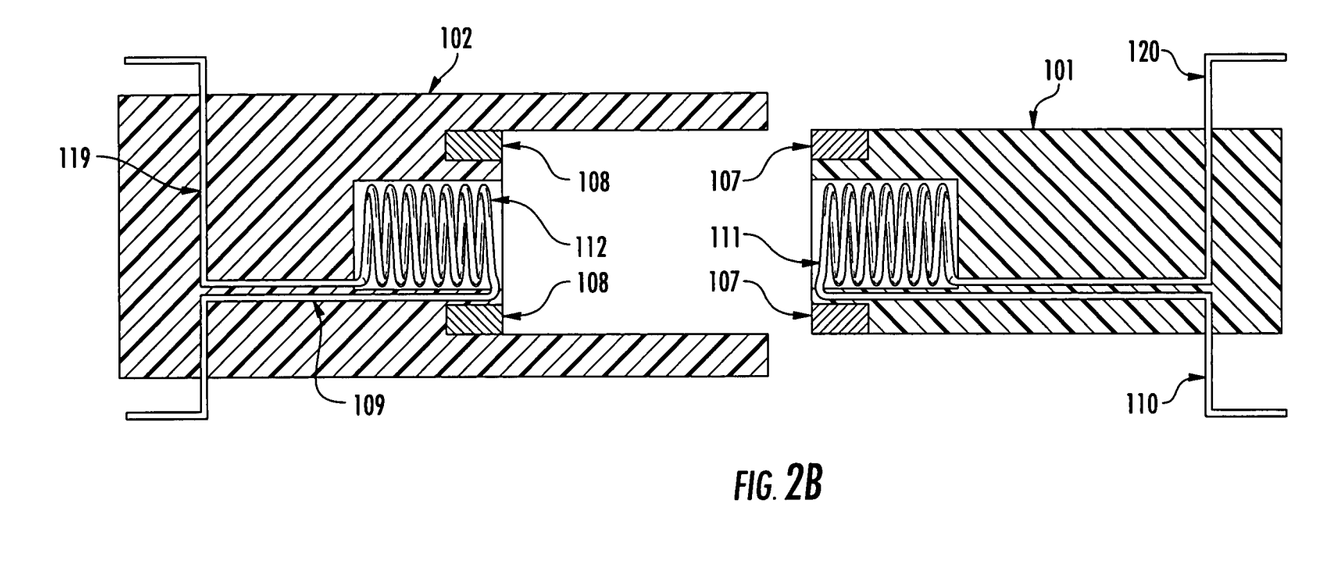
Figure 3:
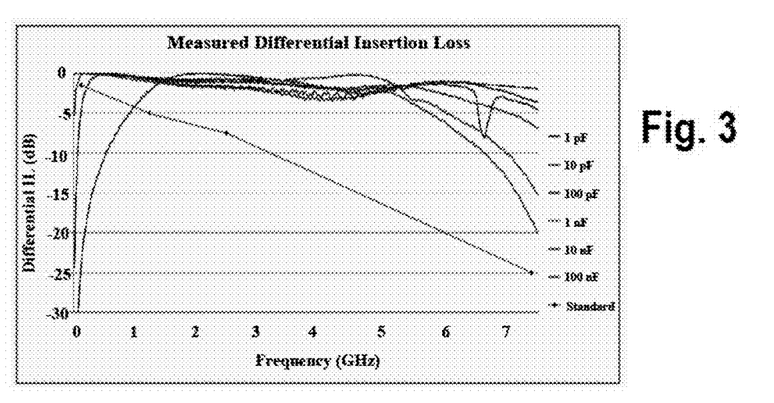
FIG. 3: insertion loss measurements with Agilent E8361A network analyzer for six different capacitance values

The physical principals that govern the NMC in FIG. 2 are based on three fundamental concepts of electromagnetic theory. They are Gauss's Law, voltage potential and the relationship between voltage, charge and capacitance. Later it will be explained why capacitance matters. Gauss's Law states in words that the electric flux passing through any closed surface is equal to the total charge enclosed by that surface [5]. Mathematically, this can be written as:

$$\psi = \oint D_s \cdot dA = \oint \epsilon E \cdot dA = \epsilon \oint dA = Q_{enc}$$

Where $\psi$ is the electric flux flowing through the surface of the NMC plates, Ds is the electric flux density and $Q_{enc}$ is the total change enclosed by the surface of the NMC plates. If the electric flux density is known, the electric field intensity can be found by the auxiliary equation $D = \epsilon E$. The electric field for a parallel plate therefore is:

$$E = \frac{Q}{\epsilon A}$$

Using this concept and definition for voltage potential we get:

$$V = -\int E \cdot dl = -\int \frac{Q}{\epsilon A} \cdot dl = -\frac{Q}{\epsilon A}\int dl = -\frac{Ql}{\epsilon A}$$

The relationship between voltage potential, charge and capacitance is:

$$C = \left(\frac{1}{V}\right)Q = \frac{\epsilon A}{l} = k\frac{A}{l}$$

Substituting the above relationship into this equation, the capacitance between the two plates finally is:

$$C = \left(\frac{1}{V}\right)Q = \frac{\epsilon A}{l} = k\frac{A}{l}$$

The equation above can and does change depending on which type of geometry is used. In this case, the geometry is for parallel plates. This is exactly the governing principle behind signal transfer for the USB 3.0.

Figure 4A:
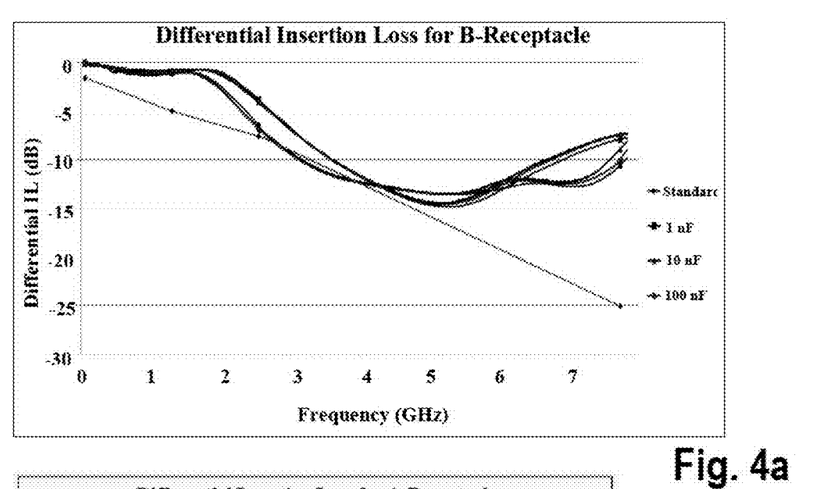
FIG. 4A and FIG. 4B show HFSS simulations for differential insertion loss for the NMC USB 3.0 A-receptacle mated pair and B-receptacle mated pair, respectively
Figure 4B:
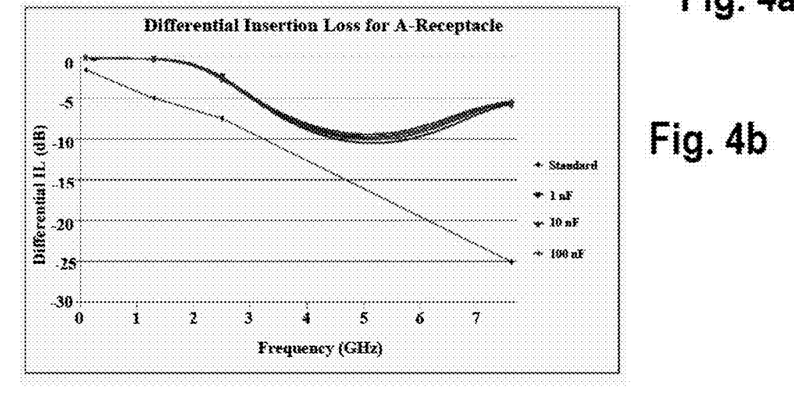
Figure 5:
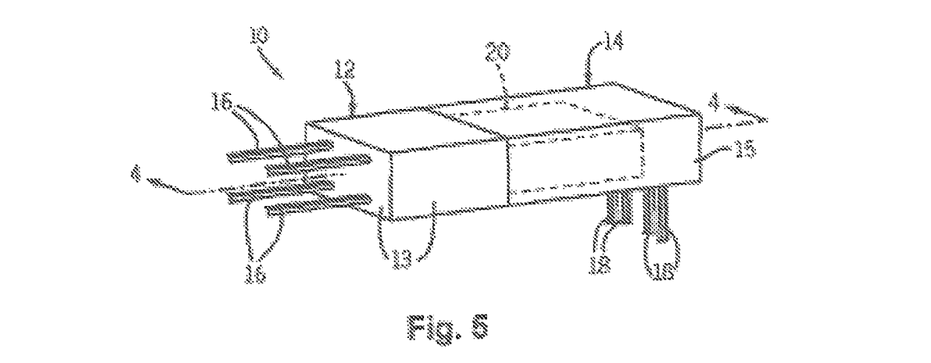
FIG. 5: is a front perspective view of the mated pair for the USB 3.0 A-receptacle, the first embodiment of the invention.
Figure 6:
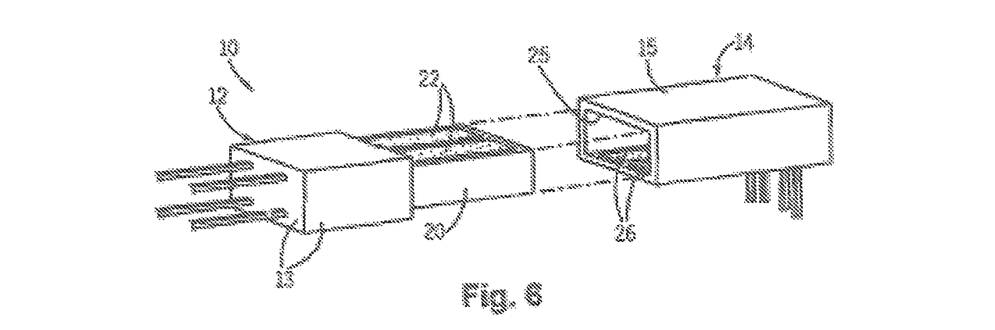
FIG. 6: is an unmated, exploded front perspective view of the first embodiment.
Figure 7:
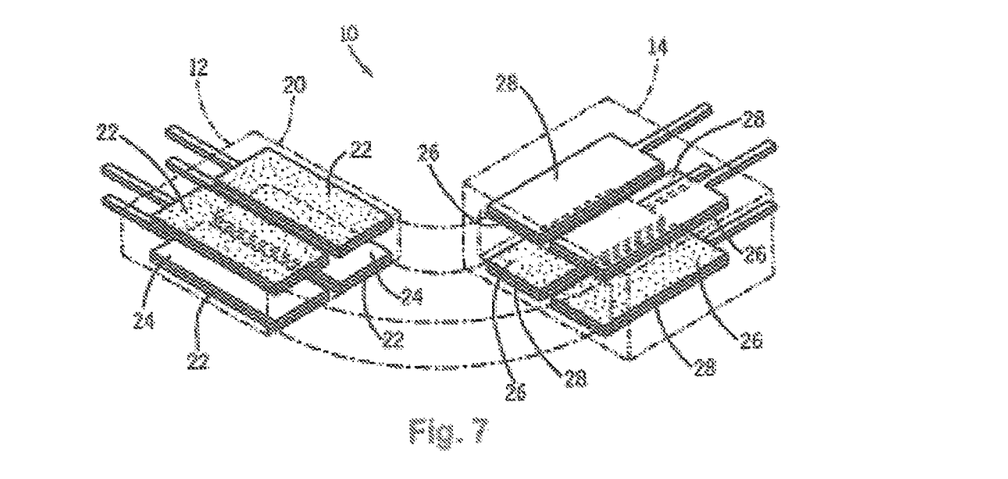
FIG. 7: is an exploded clamshell-style perspective view showing internal construction parts in phantom.
Figure 8:
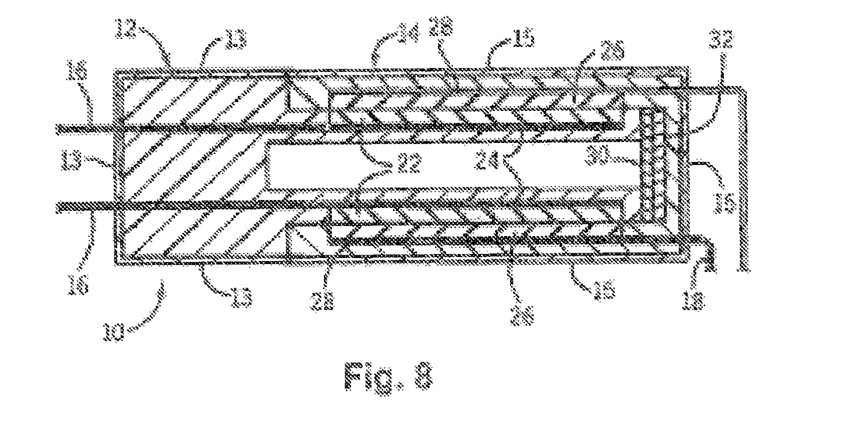
FIG. 8: is a cross-sectional view taken of the A-receptacle mated pair on line 4-4 of FIG. 6.1.
Figure 9:
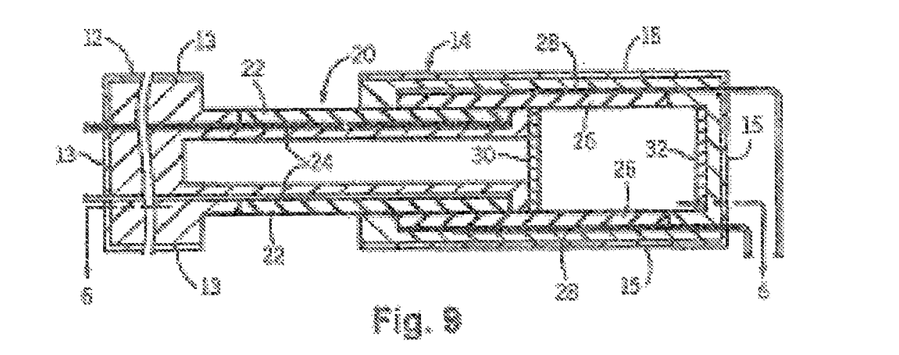
FIG. 9: is a cross-sectional view similar to FIG. 6.4, showing the components partially separated.
Figure 10:
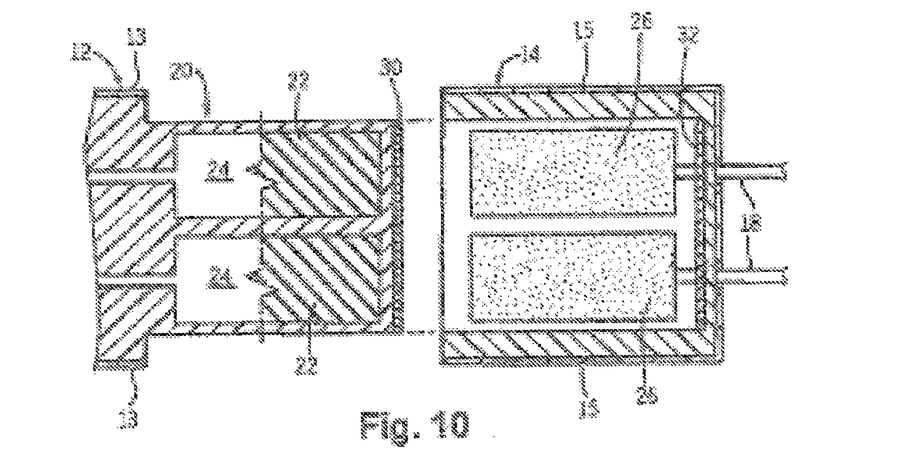
FIG. 10: is a cross-sectional view with parts broken away, taken on line 6-6 of FIG. 6.5, although unlike

According to the USB 3.0 Specification Handbook, the acceptable amount of differential insertion loss in a mated cable assembly is defined by four vertices which are at: (100 MHz, −1.5 dB), (1.25 GHz, −5.0 dB), (2.5 GHz, −7.5 dB), (7.5 GHz, −25 dB). Since the NMC is essentially a parallel plate capacitor the insertion loss for it is directly related to its capacitance value. The claim for the NMC USB 3.0 is that the capacitance value will be within the range of 0.1 nF to 100 nF in order to meet the industry requirement for insertion loss. The simulations for the NMC A-receptacle and B-receptacle are shown in FIGS. 4a and 4b respectively which confirm this claim of what is an acceptable capacitance range that yields the acceptable amount of insertion loss with respect to the standard.

The principles of operation behind the power NMC are the most fundamental principles of electromagnetics. They are the same governing dynamics behind solenoids, relays, motors, generators and transformers. We know that whenever a time varying current I(t) travels through a wire, a magnetic field B radiates perpendicular to the flow of current flowing through that wire as described in detail below.

INCORPORATION BY REFERENCE

What follows is a cite list of references which are, in addition to those references cited above and below herein, and including that which is described as background, the invention summary, brief description of the drawings, the drawings and the abstract, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

Joshua Benjestorf, et al., "Non-mating connector for USB a quality waterproof connection", 2013 IEEE International Conference on Consumer Electronics (ICCE), 11-14 Jan. 2013 ISSN: 2158-3994, pp. 560-563

DETAILED DESCRIPTION

FIG. 1 shows both the female A-receptacle and B-receptacle for the USB 3.0 (a) and its NMC equivalents (b). It should be noted that the NMC USB 3.0 uses the same physical dimensions as the current standard USB connector(s). This was a design requirement in order to maintain continuity with the industry.

FIGS. 1-13 show USB 3.0 A-receptacle 10 overall non-mating connector invention, showing a mated pair, the first embodiment of the invention. The Male component housing 12 for the A-receptacle. The nonconductive housing mold 13 of component 12. It is the housing that surrounds the male component of the connector. For connectors, housing is usually called mold and some common mold materials used for connectors are PPC or Teflon. Other materials are possible so long as it is a very good insulator. The female receptacle component housing 14 for the A-receptacle.

The nonconductive housing mold 15 of component 14. It is the housing that surrounds the female component of the connector. Just as in 13, the female housing can be made from PPC or Teflon unless the application requires it to be different. For NMCs, this typically will not be the case in order to avoid having to use more than one type of material for housing mold. Other materials are possible so long as it is a very good insulator.

The ohmic contacts 16 of component 12 can be made from materials such as copper, but are no restricted to only copper. The only requirement is the material that makes up the ohmic contact is a good conductor of electric current. The ohmic contacts 18 of component 14, just as in 16, can be made from materials such as copper, but are not restricted to only copper. The only requirement is the material that makes up the ohmic contact is a good conductor of electric current.

The insertable portion 20 of component 12. This insertable portion is the male A-receptacle. The high-k dielectric material 22 of component 12. The conductive plates 24 of component 12. The plates are mounted between the mold of 13 and the high-k dielectric layer of 22 of component 12. This plate is made from a very thin, highly conductive metal. Examples could be, but are not limited to, copper, gold-plated stainless steel, platinum, etc. The opening 25 of component 14. The high-k dielectric plates 26 of component 14. The conductive plates 28 of component 14. The plates are mounted between the mold of 15 and the high-k dielectric layer of 26 of component 14. This plate is made from a very thin, highly conductive metal. Examples could be, but are not limited to, copper, gold-plated stainless steel, platinum, etc. The magnet 30 of component 12. It is mounted and secured at the end tip of 12. The purpose of 30 is for making contact with 32 with the objective of joining, locking and securing 12 and 14 together. The magnet 32 of component 14. It is mounted and secured at the back of 14. The purpose of 32 is for making contact with 30 with the objective of joining, locking and securing 12 and 14 together.

Figure 11:
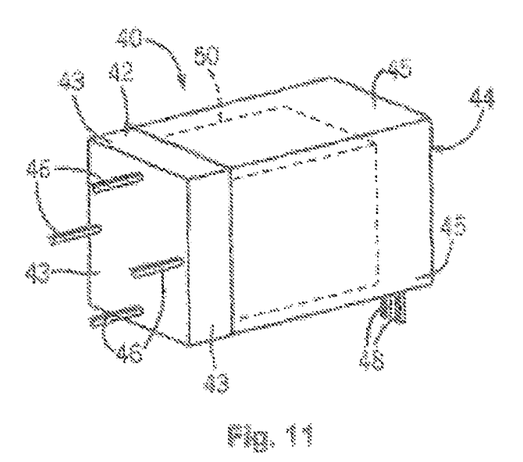
FIG. 11: is a front perspective view of the mated pair for the USB 3.0 B-receptacle, the second embodiment of the invention.
Figure 12:
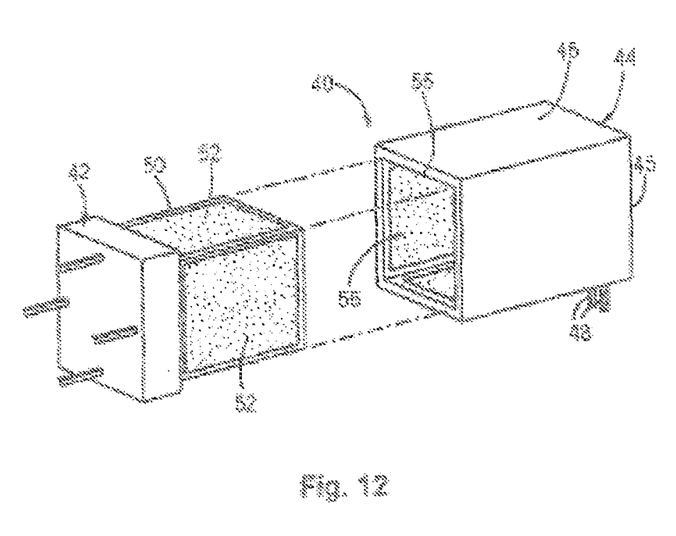
FIG. 12: is an unmated, exploded front perspective view of the second embodiment.
Figure 13:
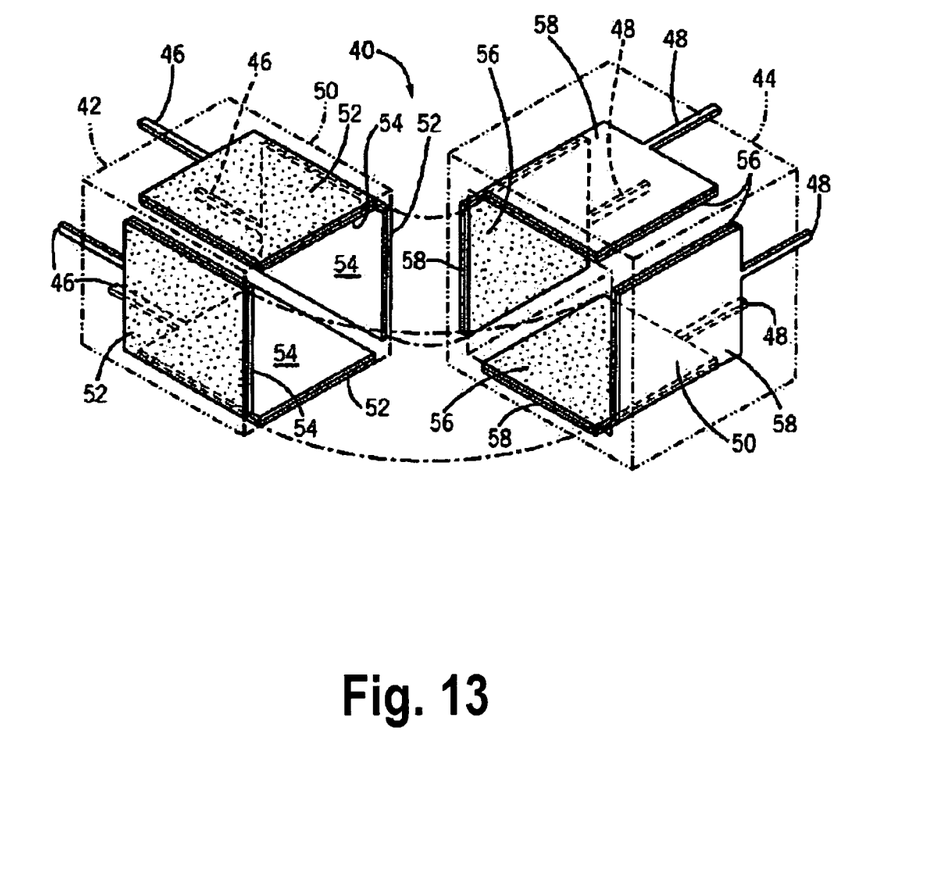
FIG. 13: is an exploded clamshell-style perspective view showing internal construction parts in phantom.

The USB 3.0 B-receptacle overall non-mating connector invention 40, showing a mated pair, the second embodiment of the invention. The male component 42 of the second embodiment. The nonconductive housing mold 43 of component 42. It is the housing that surrounds the male component of the connector.

For connectors, housing is usually called mold and some common mold materials used for connectors are PPC or Teflon. Other materials are possible so long as it is a very good insulator. The female receptacle component housing 44 for the B-receptacle. The nonconductive housing mold 45 of component 44. It is the housing that surrounds the female component of the connector. Just as in 43, the female housing can be made from PPC or Teflon unless the application requires it to be different. For NMCs, this typically will not be the case in order to avoid having to use more than one type of material for housing mold.

Other materials are possible so long as it is a very good insulator. The ohmic contacts 46 of component 42. They can be made from materials such as copper, but are not restricted to only copper. The only requirement is the material that makes up the ohmic contact is a good conductor of electric current. The ohmic contacts 48 of component 44. Just as in 46, they can be made from materials such as copper, but are not restricted to only copper. These must also be good conductors.

The insertable portion 50 of component 42 is the male B-receptacle. The high-k dielectrics 52 of component 42 The conductive plates 54 of component 42. The plates are mounted between the mold of 42 and the high-k dielectric layer of 52 of component 42. This plate is made from a very thin, highly conductive metal. Examples could be, but are not limited to, copper, gold-plated stainless steel, platinum, etc. The opening 55 of component 44.

The high-k dielectric plates 56 of component 44. The conductive plates 58 of component 44. The plates are mounted between the mold of 44 and the high-k dielectric layer of 56 of component 44. This plate is made from a very thin, highly conductive metal. Examples could be, but are not limited to, copper, gold-plated stainless steel, platinum, etc.

Power Connector

Figure 14:
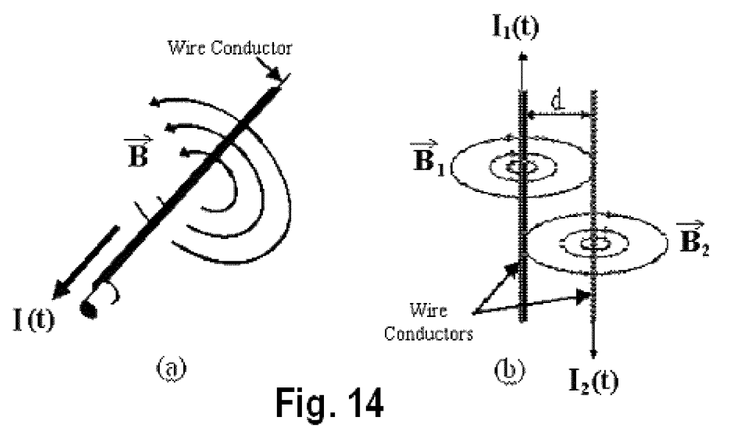
FIG. 14A and FIG. 14B illustrate a demonstration of Ampere's Law (a) showing how a current I(t) traveling through a wire creates a perpendicular magnetic field B and Faraday's Law of induction (b) showing how a current $I_1(t)$ that travels through one wire, which produces an adjacent magnetic field $B_1$, can induce a second current $I_2(t)$ into a second wire, separated by a distance d, resulting in a second magnetic field $B_2$.

As outlined above, the principles of operation behind the power NMC are the same governing dynamics behind solenoids, relays, motors, generators and transformers. We know that whenever a time varying current I(t) travels through a wire, a magnetic field B radiates perpendicular to the flow of current flowing through that wire as shown in FIG. 14 and by Ampere's circular law.

FIG. 2A depicts the inductive power connector, in connected configuration. Conductors 109, 110, 119, 129 supply power and ground to male coil 111 and female coil 112. Permanent magnets 107 and 108 hold the connected assembly together, in much the same way discussed previously for the magnetic plates used in the capacitive connector. FIG. 2b depicts the inductive power connector, in unconnected configuration. Housings 101 and 102 seal the unit from its environment, extending across in front of the coils 111 and 112

The mathematical derivation that describes the relationship between current density J and the magnetic field H is Ampere's circular law:

$$\nabla \times H = J + \frac{\partial D}{\partial t}$$

Where H is the magnetic field intensity, J is the density of current and D is the electric flux density. The density of the magnetic field B and its intensity H are interrelated by the permeability of free space $\mu_0$. The auxiliary equation relates the two: $B=\mu_0 H$. Applying Stokes Theorem to equation (1) we can find a relationship between the magnetic field B and the current I.

$$\int_S (\nabla \times B) \cdot dS = \oint_C B \cdot dl \quad (2)$$

$$\int_S \left(J + \frac{\partial D}{\partial t}\right) \cdot dS = \mu_0 \int \int_S J \cdot dS = \mu_0 I_{enc} \quad (3)$$

From equations (2) and (3) we can easily see the relationship between the magnetic field B and the current I:

$$\oint_C B \cdot dl = \mu_0 I_{enc} \quad (4)$$

What equation (4) says is that the magnetic field B circulating the contour is equal to the enclosed current I that is moving through it, which is exactly what FIGS. 14a and 14b illustrate.

Figure 15:
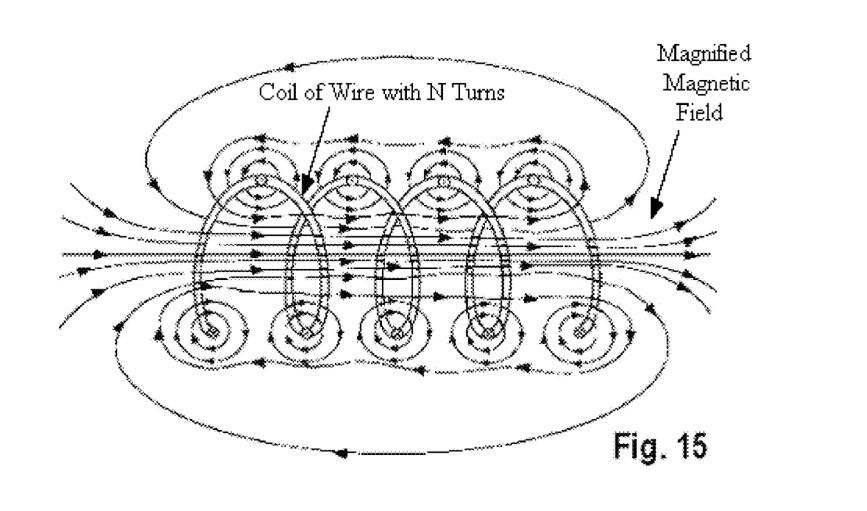
FIG. 15: Physical illustration of what happens in a coil of wire when a current flows

For the power NMC, wire conductors simple will not cut it. The magnetic field that travels through an insulating material will have to be much stronger than the field generated by $I_{enc}$. For this reason the wires are wound into a coil resulting in a magnification of the magnetic field as shown in FIG. 15, which provides a physical illustration of what happens in a coil of wire when a current flows through it. The magnetic lines of force from the magnetic field reinforce each other in proportion to the number of turns in the coil. The power NMC uses two coils: the M-Coil 111 ($L_2$) and F-Coil 112 ($L_1$).

Figure 16:
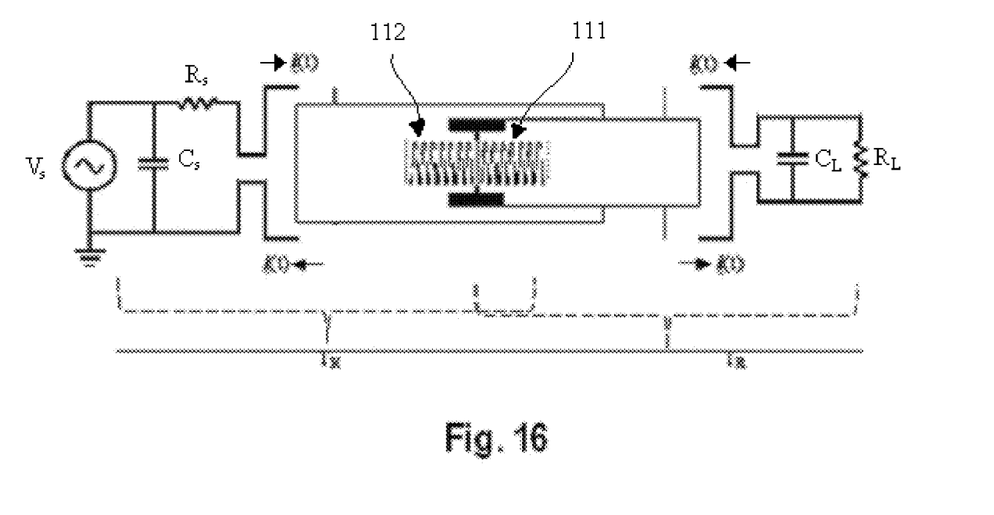
FIG. 16: High-level (simplified) Power NMC schematic setup.

As already mentioned, the number of turns N that a coil has can be thought of as the magnification factor of the magnetic field, which is solidly responsible for signal transfer. For example, if the strength of the magnetic field around a coil that has one turn is X, then the strength of the same coil with three turns will be 3X. The power NMC uses this concept. FIG. 16 shows the power NMC connected to a time varying source $V_S$, representing the signal being transmitted $T_X$, and the receiving source $T_R$. The F-Coil is on the transmitting side, $T_X$, which is $L_1$ and the M-Coil is on the receiving side, $T_L$, which is $L_2$ as shown in the figure.

As FIG. 16 also shows, the ideas behind the setup of the power NMC is nothing more than an RLC resonance tank circuit which means both the transmitting and receiving sides will have to be tuned for resonance for maximum power transfer, or efficiency. Both the M and F-Coils ($L_1$ and $L_2$) will also need the highest Q-factor possible for optimal efficiency which is dependent on the values chosen for $R_{S,L}$, $L_{1,2}$ and $C_{S,L}$ according to equation (5).

$$Q = \frac{1}{R}\sqrt{\frac{L}{C}} \quad (5)$$

Since each power NMC has two inductive, there are two Q-factors, one for each coil called $Q_{L1}$ and $Q_{L2}$. The optimal efficiency, $\eta_{opt}$, for the entire power NMC can be found after each of the two Q-factors have been found as well as the coupling coefficient, k. This coefficient is the fraction of flux of $L_1$ from the transmission side that permeates through to the receiving side and into $L_2$ of FIG. 16. The optimal efficiency, be found by (6).

$$\eta_{opt} = \frac{k^2(Q_{L1}Q_{L2})}{\left(1 + \sqrt{1 + k^2 Q_{L1} Q_{L2}}\right)^2} \quad (6)$$

In addition to the Q-factors for each NMC inductive coil, there is the resonate frequency for optimal performance. Resonance takes place when both the capacitive reactance $X_C$ and inductive reactance $X_L$ for both $T_X$ and $T_R$ are equal and opposite. This frequency can be found by (7).

$$f_0 = \frac{0}{2\pi} = \frac{1}{2\pi\sqrt{LC}} \quad (7)$$

And finally, it should be mentioned that the distance separating the two coils must be as small as possible in order to maintain optimal signal transfer. Also, the insulating material, or mold, between the two NMC receptacles need to be taken into account since the material will have an effect on how well the magnetic energy transfers from $T_X$ to $T_R$. For this reason, each material chosen for a particular NMC power application must have a reasonable tan(δ) which is the loss coefficient.

The above-description is developed on various embodiments in accordance with the present invention. It is to be noted that the scope of the present invention is not limited by the embodiments. For example, an embodiment obtained by combining arrangements or constructions included in two or more of the above-described embodiments as required also falls within the scope of the present invention.

The invention claimed is:

1. A connector comprising two mechanically coupled electromagnetic energy carriers, a male carrier and a female carrier wherein each said carrier is electrically connected to an electric circuit and wherein at least one of said circuits comprises a consumer electrical or electronic product and wherein, when said carriers are coupled to form said connector, said product interacts with said other circuit in conformity with an existing electrical connector standard and further comprising a housing enclosing each carrier wherein said housing substantially eliminates penetration of moisture into each respective electrical connection to an electric circuit and wherein at least one of said housings further comprises an insulating layer substantially blocking direct current conduction to said other housing, wherein;
said male carrier further comprises a male receptacle and a male transfer element and
said female carrier further comprises a female receptacle and a female transfer element
each said transfer element is a dielectric element formed of high-k dielectric and wherein said carriers further comprise a sliding pair of plates engageable to form a capacitor and wherein said connector housing insulating layer is made from a material such as PPC (polypropylene carbonate) or polytetrafluoroethylene, further comprising
a male metallic plate
a male ohmic contact
a male magnet and wherein
the male ohmic contact is electrically connected to the male metallic plate and one of the edges of the metallic plate is connected to one of said circuits, a circuit A
a female metallic plate
a female ohmic contact
a female magnet and wherein
the female ohmic contact is electrically connected to the female plate and one of the edges of the metallic plate is connected to the other of said circuits, a circuit B; and
said capacitor formed is of the parallel plate type.

2. The connector according to claim 1 wherein said coupling further comprises
an inductive power connector and wherein said sliding pair of plates further comprises a high-k dielectric pair engageable to form a parallel plate capacitor.

3. The connector of claim 2 wherein:
the male ohmic contact is electrically connected to the male-plate and one of the edges of the metallic plate is connected to the circuit A
the female ohmic contact is electrically connected to the female-plate and one of the edges of the metallic plate is connected to the circuit B.

4. The connector of claim 3 wherein, in the engaged disposition, said metallic plates are separated by a layer of electrical insulation formed of a viscous polymer photoresist and said two high-k dielectrics are in physical contact.

5. The connector of claim 1 wherein said capacitor is a high-k dielectric.

6. The connector of claim 2 wherein said sliding pair of plates further comprises a pair of metallic plates on glass substrates wherein each metallic plate is connected to one of said circuits and wherein said dielectric elements are mounted on said substrates distally to said metallic plates.

7. The connector of claim 6 wherein each said dielectric element is a high-k dielectric element.

8. The connector of claim 7 wherein said high-k dielectric element is formed of a viscous polymer photoresist.

9. The connector of claim 8 wherein said viscous polymer photoresist is SU-8 and said USB standard is USB 3.0.

10. The connector of claim 9 wherein said connector housing insulating layer is made from a material such as PPC (polypropylene carbonate).

11. The connector of claim 8 wherein the capacitance range is between 0.1 nF and 100 nF.

12. A connector comprising two mechanically coupled electromagnetic energy carriers, a male carrier and a female carrier wherein each said carrier is electrically connected to an electric circuit and wherein at least one of said circuits comprises a consumer electrical or electronic product and wherein, when said carriers are coupled to form said connector, said product interacts with said other circuit in conformity with an existing electrical connector standard and further comprising a housing enclosing each carrier wherein said housing substantially eliminates penetration of moisture into each respective electrical connection to an electric circuit and wherein at least one of said housings further comprises an insulating layer substantially blocking direct current conduction to said other housing, wherein;
said male carrier further comprises a male receptacle and a male transfer element and
said female carrier further comprises a female receptacle and a female transfer element.
wherein said each transfer element is a dielectric element and wherein said male transfer element further comprises at least one surface brought into low-loss electrical contact and locking in place when coupled with said female transfer element, wherein;
each said male carrier and female carrier further comprises a coil
two ohmic contacts are physically connected to each coil, one contact for each end of each coil; and
when both coils are brought into proximity, a mated pair is formed between the male and female receptacles conforming to said electrical standard, further comprising an inductive connector having sufficient turns for signal transfer and wherein
said carriers further comprises a sliding pair of plates having dielectric elements engageable to form a parallel plate capacitor
said electrical connector standard is a USB standard; and
the male and female coils are separated by a small space of housing molding that exists on both receptacles.

13. A connector comprising two mechanically coupled electromagnetic energy carriers, a male carrier and a female carrier wherein each said carrier is electrically connected to an electric circuit and wherein at least one of said circuits comprises a consumer electrical or electronic product and wherein, when said carriers are coupled to form said connector, said product interacts with said other circuit in conformity with an existing electrical connector standard and further comprising a housing enclosing each carrier wherein said housing substantially eliminates penetration of moisture into each respective electrical connection to an electric circuit and wherein at least one of said housings further comprises an insulating layer substantially blocking direct current conduction to said other housing, wherein;

said male carrier further comprises a male receptacle and a male transfer element and said female carrier further comprises a female receptacle and a female transfer element, wherein said each transfer element is a dielectric element and wherein said male transfer element further comprises at least one surface brought into low-loss electrical contact and locking in place when coupled with said female transfer element. wherein;

each said male carrier and female carrier further comprises a coil two ohmic contacts are physically connected to each coil, one contact for each end of each coil; and when both coils are brought into proximity, a mated pair is formed between the male and female receptacles conforming to said electrical standard, further comprising at least one surface brought into low-loss electrical contact and locking in place when coupled with said female transfer element and wherein said connector housing insulating layer is made from a material such as PPC (polypropylene carbonate).

14. The connector according to claim 13 wherein each said male carrier and female carrier comprises a coil and wherein each said coil further comprises sufficient turns for signal transfer.

15. A connector comprising two mechanically coupled electromagnetic energy carriers, a male carrier and a female carrier wherein each said carrier is electrically connected to an electric circuit and wherein at least one of said circuits comprises a consumer electrical or electronic product and wherein, when said carriers are coupled to form said connector, said product interacts with said other circuit in conformity with an existing electrical connector standard and further comprising a housing enclosing each carrier wherein said housing substantially eliminates penetration of moisture into each respective electrical connection to an electric circuit and wherein at least one of said housings further comprises an insulating layer substantially blocking direct current conduction to said other housing, wherein;

said male carrier further comprises a male receptacle and a male transfer element and said female carrier further comprises a female receptacle and a female transfer element, wherein said each transfer element is a dielectric element and wherein said male transfer element further comprises at least one surface brought into low-loss electrical contact and locking in place when coupled with said female transfer element. wherein;

each said male carrier and female carrier further comprises a coil two ohmic contacts are physically connected to each coil, one contact for each end of each coil; and when both coils are brought into proximity, a mated pair is formed between the male and female receptacles conforming to said electrical standard, wherein the female connector is an electrical wall socket.

16. A connector comprising male and female metal plates made from very thin, highly conductive metal such as copper or gold and attached to each metallic plate is a trace of two mechanically coupled electromagnetic energy carriers, a male carrier and a female carrier and wherein each said carrier is electrically connected to an electric circuit and wherein at least one of said circuits comprises a consumer electrical or electronic product and when said carriers are coupled to form said connector, said product interacts with said other circuit in conformity with an existing electrical connector standard and further comprising;

a housing enclosing each said carrier wherein said housing substantially eliminates penetration of moisture into each respective electrical connection to an electric circuit and wherein at least one of said housings further comprises;

an insulating layer substantially blocking direct current conduction to said other housing.

a male receptacle a male high-k dielectric a female receptacle a female high-k dielectric said industrial connector standard is a USB standard.

each said male carrier and female carrier further comprises a coil two female ohmic contacts physically connected to the female-coil, one contact for each end of the coil said coils are brought into proximity when a mated pair is formed between the male and female Receptacles.

said male ohmic contacts are physically connected to the male coil, one contact for each end of the coil.

an inductive connector having sufficient turns for signal transfer and wherein said mechanically coupled electromagnetic energy carriers further comprise a sliding pair of plates having dielectric elements engageable to form a parallel plate capacitor wherein said sliding pair of plates further comprises a pair of metallic plates on glass substrates wherein each metallic plate is connected to one of said circuits and wherein said dielectric elements are mounted on said substrates distally to said metallic plates and wherein said high-k dielectric element Is formed of a viscous polymer photoresist said viscous polymer photoresist is SU-8 and said USB standard is USB 3.0 said connector housing insulating layer is made from a material such as PPC (polypropylene carbonate).

17. The connector of claim 16 wherein the glass slide substrate is sonicated in DI water followed by a rinse in Acetone and Isopropanol and coated with 1:15 cyclopentanone before being baked at 115° C. for 10 minutes over a hotplate covered with aluminum wrap, then mounted onto a carrier wafer where 7 μm of Cu is deposited onto the substrate in a CHA sputter, said substrate and deposited Cu then submerged in 30% H2O2 for 5-10 seconds and thoroughly rinsed with DI water and methanol or IPA followed by 2.5 μm of SU-8 being deposited over the Cu by spinning.

* * * * *